United States Patent
Susslin

[15] 3,662,334
[45] May 9, 1972

[54] VEHICLE LIGHT WARNING SYSTEM

[72] Inventor: Ralph M. Susslin, 212 Franklin Street, Paterson, N.J. 07524

[22] Filed: Nov. 17, 1969

[21] Appl. No.: 877,233

[52] U.S. Cl. .............................................340/52 D, 315/77
[51] Int. Cl............................................................B60q 1/00
[58] Field of Search .................................................340/52 D

[56] References Cited

UNITED STATES PATENTS

| | | | |
|---|---|---|---|
| 2,722,673 | 11/1955 | Turner | 340/275 X |
| 2,799,843 | 7/1957 | Savino | 340/275 X |
| 2,820,215 | 1/1958 | Hughes | 340/54 |
| 3,145,322 | 8/1964 | Yazigi | 340/52 D |
| 3,473,083 | 10/1969 | Guida | 315/130 X |
| 2,878,462 | 3/1959 | Tralli | 340/80 X |

FOREIGN PATENTS OR APPLICATIONS

| 612,533 | 8/1926 | France | 340/80 |
|---|---|---|---|

Primary Examiner—John W. Caldwell
Assistant Examiner—Kenneth N. Leimer
Attorney—Clarence A. O'Brien and Harvey B. Jacobson

[57] ABSTRACT

A pair of indicator lamps provide warnings for a vehicle operator signifying either that the vehicle lamps should be turned on when illumination is needed or turned off upon opening of the vehicle door. The warning system does not affect the usual vehicle lighting system and operates off the vehicle power supply.

4 Claims, 1 Drawing Figure

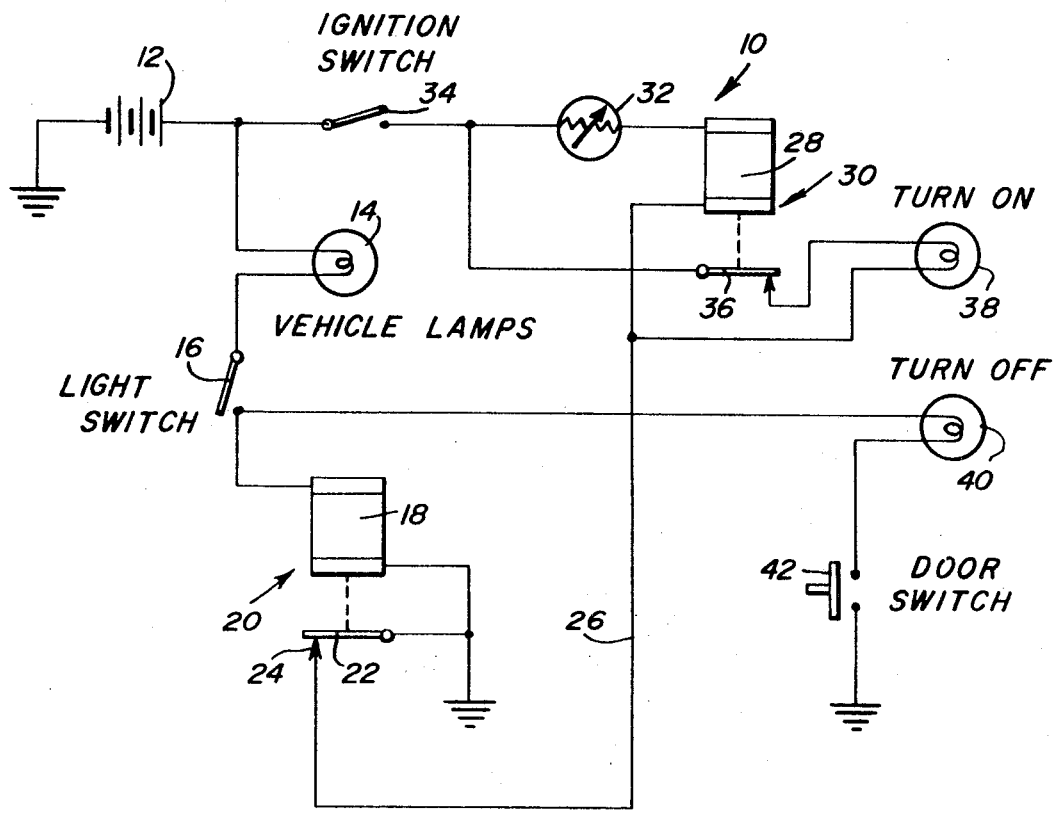

VEHICLE LIGHT WARNING SYSTEM

This invention relates to automotive vehicle lighting circuits and more particularly to a light sensitive warning system for an automotive vehicle operator.

There are occasions when motorists forget to turn on the vehicle lighting system and thereby create a hazardous situation. More often, motorists forget to turn off the vehicle lighting system when departing from the vehicle so as to cause run down of the vehicle battery. Automatic light sensitive systems have been devised for turning on the vehicle lights which of course requires substantial modification of the lighting circuit. It is, however, an important object of the present invention to avoid such modification of the vehicle lighting circuit and yet cope with the problem by providing a warning to the vehicle operator whenever the vehicle lights should be turned on as well as to warn the vehicle operator that the lights should be turned off when departing from the vehicle.

In accordance with the present invention, a photoresistive element is connected to the vehicle battery or power supply through the ignition switch in order to control illumination of a first lamp indicator through a relay thereby warning the vehicle operator that the vehicle lamps should be turned on. When the vehicle lamp switch is closed, a second relay is energized to disable the first lamp indicator and a second indicator lamp is conditioned for operation. Upon opening of a vehicle door, the second indicator lamp is operatively conditioned, is turned on to warn the motorist that the vehicle lighting system should be turned off prior to departing from the vehicle.

These together with other objects and advantages which will become subsequently apparent reside in the details of construction and operation as more fully hereinafter described and claimed, reference being had to the accompanying drawing forming a part hereof, wherein like numerals refer to like parts throughout.

Referring now to the drawing in detail, the warning system of the present invention generally denoted by reference numeral 10 is associated with a vehicle lighting system energized from the vehicle power supply including for example the vehicle battery 12, the output terminal of which is connected to the vehicle lamps as exemplified by lamp 14 in the drawing. A manually operated light switch 16 usually associated with the vehicle lighting system when closed completes an energizing circuit for the vehicle lamps. In accordance with the present invention, however, the vehicle lamp circuit when completed by closing of the light switch 16, is connected to ground in series with a relay coil 18 associated with a disabling relay 20.

A normally closed relay switch 22 is associated with the relay 20 so as to normally ground the stationary contact 24 and conductor 26 thereby establishing a ground connection for a relay coil 28 associated with a control relay 30. The relay coil 28 is connected in series with a light sensitive, photoresistive component 32 to the output terminal of the vehicle battery 12 upon closing of the vehicle ignition switch 34. A normally closed relay switch 36 is associated with the relay 30 so as to electrically connect the ignition switch 34 to a first indicator lamp 38 thereby completing an indicator energizing circuit to ground through conductor 26 and normally closed relay switch 22 in parallel with the series connected photoresistive component 32 and relay coil 28.

A second indicator lamp 40 is connected to the output side of the light switch 16 so as to complete a circuit to ground upon closing of a normally opened exit controlling door switch 42 in parallel with the relay coil 18. The door switch 42 is suitably mounted so as to be closed upon opening of a vehicle door, preferably the door adjacent the vehicle operator in order to cause illumination of the lamp 40 should the vehicle operator attempt to depart from the vehicle without opening the light switch 16.

It will be apparent, that when the vehicle is in operation with the ignition switch 34 closed, energizing current for the relay coil 28 will be conducted through the light sensitive component 32 during daylight hours in view of the relatively low resistance thereof. Energization of the relay coil 28 will accordingly open the relay switch 36 to prevent energization of the indicator lamp 38. When external illumination reaches a low enough value, the resistance of the component 32 rises thereby reducing the current through the relay coil 28 below energizing value. The relay switch 36 will then close so as to complete an energizing circuit through the indicator lamp 38. The indicator lamp 38 may be mounted at a suitable location on the control dash of the vehicle, for example, and when energized illuminates appropriate indicia signifying that the vehicle lamps should be turned on. When the vehicle operator turns on the vehicle lamps by closing of the switch 16, the relay coil 18 in series with the vehicle lamps 14 will be energized to thereby open the normally closed relay switch 22. Opening of the relay switch 22 interrupts the energizing circuits for the relay coil 28 and the indicator lamp 38 so as to prevent operation of this warning circuit section. Further, by closing of the light switch 16 energizing the relay 20, the indicator lamp 40 is conditioned for operation. Accordingly, if the motorist fails to open the light switch 16 before departing from the vehicle, upon opening of the vehicle door the door switch 42 closes to energize the indicator lamp 40 which thereby illuminates appropriate indicia on the control dash signifying that the vehicle lamps should be turned off. The vehicle lamps as well as the indicator lamp 40 are connected to the vehicle battery 12 in by-pass relation to the ignition switch 34 since they are designed to operate while the vehicle is in a non-operating condition. An audible type of indicator such as a buzzer or a chime may optionally be added in parallel with the indicator lamp 40 or alternatively replace the indicator lamp as the warning device.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a lighting system for a vehicle having a source of electrical energy, lamp means and switch means for selectively energizing the lamp means from the source, a warning system comprising at least two separate indicator devices mounted internally of the vehicle, light sensitive means connected to the source for operating one of the indicator devices, means responsive to closing of the switch means for disabling said one of the indicator devices, and exit control means connected to the other of the indicator devices for activating the same only when the switch means is closed, said disabling means comprising a relay coil connected to said source in series with the vehicle lamp means and the switch means and a normally closed relay switch connected to said one of the indicator devices and opened in response to energization of the relay coil, said light sensitive means including relay means connected to the normally closed relay switch of the disabling means for preventing operation of said one of the indicator devices and a photoresponsive element connecting the source to the relay means for energization thereof.

2. The combination of claim 1 wherein said vehicle includes a door, said exit control means comprising a normally open switch closed by opening of the door and connected in series with the other of the indicator devices to the switch means.

3. The combination of claim 2 wherein said two separate indicator devices are visually distinguishable lamps.

4. The combination of claim 1 including an ignition switch connected between the source and the light sensitive means.

* * * * *